Figure 1:
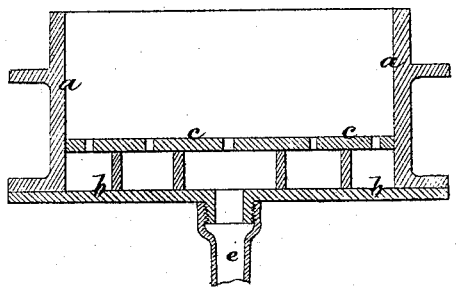

F. RANSOME, E. L. RANSOME & H. BESSEMER.

Improvement in the Manufacture of Artificial Stone.

No. 131,561. Patented Sep. 24, 1872.

Witnesses.
Frederick Carpenale
Deanston Carpenale

Inventors.
Henry Bessemer
Fred'k Ransome
Ernest L. Ransome

UNITED STATES PATENT OFFICE.

FREDERICK RANSOME AND HENRY BESSEMER, OF LONDON, AND ERNEST LESLIE RANSOME, OF GREENWICH, ENGLAND.

IMPROVEMENT IN THE MANUFACTURE OF ARTIFICIAL STONE.

Specification forming part of Letters Patent No. 131,561, dated September 24, 1872.

*To all whom it may concern:*

Be it known that we, FREDERICK RANSOME, of Queen-Street Place, HENRY BESSEMER, also of Queen-Street Place, both in the city of London, and ERNEST LESLIE RANSOME, of Greenwich, in the county of Kent, all in England, subjects of the Queen of Great Britain, have invented or discovered new and useful Improvements in the Manufacture of Artificial Stone, and in what manner the same is to be performed, to be particularly described and ascertained in and by the following statement thereof, that is to say—

This invention has for its object improvements in the manufacture of that class of artificial stones which are composed of a mixture of soluble silicate of soda or other alkali with sand, silex, or other material, which mixture has afterward to be treated with a solution of chloride of calcium or other solution.

We first mold the material from which the blocks of stone are to be formed, in a suitable mold or chamber, which is open at its upper side, and has a perforated or pervious bottom at its under side, below which is a hollow chamber connected by a pipe with an air-pump, by means of which air can be exhausted from the chamber. The mixture of materials of which the stone is to be composed, is put into the mold at its upper side, and the air being exhausted from the chamber below, the materials are thereby drawn down firmly and evenly toward the bottom of the mold; and in order to obtain a greater pressure when required, we place an impervious disk (flexible or otherwise) over the upper surface. We then saturate the stone by applying the solution to the upper surface of the mass while it is still in the mold, and drawing the solution through the mass by exhausting the air from the hollow chamber below it. We then prefer to take the block of stone out of the mold and immerse it in a solution of chloride of calcium, the temperature of which is gradually raised to or near a boiling point, in which the stone should remain a sufficient length of time to produce a uniform temperature throughout the mass of the stone. Or, in place of this, a hot or boiling solution of chloride of calcium may be drawn through the stone while it is in the mold. Afterward water may be drawn through the stone in the same manner to remove from it any salts which remain in a soluble state. If the stone has not been removed from the mold water may be drawn through it in the same manner as the solutions were previously drawn down; but if the stone has been removed from the mold in order that the stone may be immersed in a boiling solution of the chloride of calcium or for any other reason, then the stone may be placed in a suitable casing, so that a vacuum may be formed below its under surface while its upper surface may be covered with water. A current of air, either hot or cold, or even artificially deprived of its moisture, may afterward be drawn through the stone for the purpose of displacing the moisture and drying the stone.

In order that the mode by which we prefer to carry our invention practically into operation may be clearly understood, we have shown at Figure 1, on the sheet of drawings annexed, a vertical section of a mold such as we employ.

Figure 2:
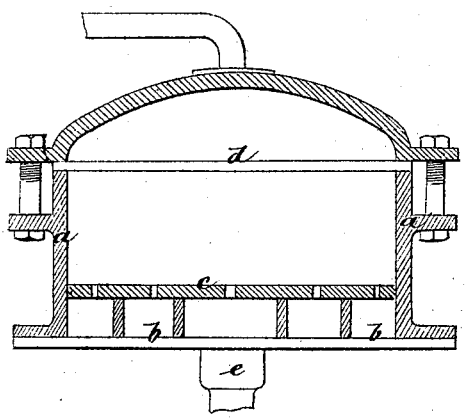
Figure 3:
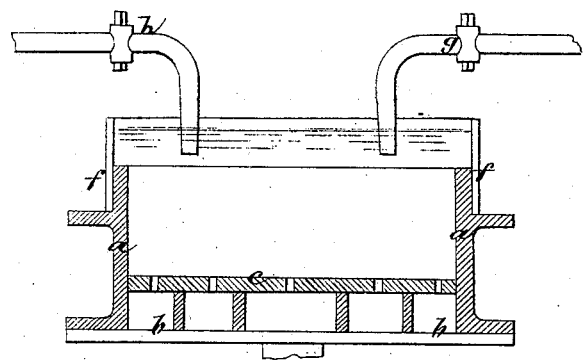

Figure 1, *a a*, is a hoop or ring of iron resting on a circular plate, *b*, and having a false bottom or movable plate, *c*, of the same dimensions as the internal diameter of the hoop or ring, which circular plate *c* is perforated with numerous small holes equally distributed over its surface, and is made to rest on frames or blocks of varying dimensions, so as to alter the position of the perforated plate to suit the required thickness of the stone when molded. A cloth or other pervious fabric may be laid over the perforated plate when desired. A pipe, *e*, leads to an exhaust-chamber, which is connected with an air-pump or other exhaust apparatus capable of exhausting or drawing off the air or any watery solution that may pass through the perforations into the box *b*. The sand and silicate of soda, or other material to be molded, is first mixed intimately together in the usual way, and is then put gradually into the hoop *a;* meanwhile the exhaust apparatus is put in operation, which will remove the air from the box and cause the external atmosphere to press upon the loose materials occupying the hoop or mold *a*. The materials are added until the hoop *a* is filled, or rather heaped up, when a thin disk of India-rubber elastic cloth or other soft impervious material is laid on over the entire surface of the molded article. The passage of the external air through the porous material will thus be prevented, and the whole weight of the atmosphere, or nearly so, will press the materials firmly down into the mold; or if it be desired to employ a greater pressure on the upper surface of the materials in the mold, a lid or cover may be fixed over the top of the mold—the edges of the disk of vulcanized India rubber being then held between a flange on the top of the mold and a flange on the cover, as shown at Fig. 2. Air or other fluid may then be forced on to the top of the flexible disk marked $d$ at the same time that air is exhausted from the bottom of the mold; or in place of drawing the solutions through the block of material in the mold by means of an exhaust, the solutions may be forced through by pressure in combination with the exhaust, or by pressure only. The cover and elastic disk may afterward be removed, and any superfluous material rising above the upper edge of hoop $a$ may be removed by passing a "striker" or straight edge across the top of the hoop and thus leveling it down. A band or hoop of India rubber, $f$, is then put around the hoop $a$, as shown in Fig. 3, and a jacketed pipe, $g$, is moved over the mold, and by opening a cock, $h$, a solution of chloride of calcium is allowed to flow all over the upper surface of the molded article, and is prevented from flowing off from it by the India-rubber band $f$. It will be observed that the nozzle of the cock $h$ becomes immersed in the fluid before the fluid reaches as high as the upper surface of the India-rubber ring, by which means the fluid is prevented from flowing over, in consequence of the pipe $g$ being in connection with a closed vessel, as is well understood. The action of the exhaust-pump will cause the fluid chloride of calcium to permeate the molded mass, and rapidly and uniformly convert the molded materials into stone. When a sufficient quantity of the chloride of calcium has been passed through the stone, the cock $h$ is closed, the exhaust being still kept up.

In order the more readily to apply the principle of exhausting air in the manufacture of artificial stone to such articles as do not present two plain or flat surfaces of large extent, we mold them hollow or on a hollow perforated or pervious core; or we insert one or more perforated tubes in the mold when the article is being molded; or we mold the article solid, and then bore a recess or cavity therein. In either case the article is placed with the aperture in connection with an air-pump, so that chloride of calcium or other fluids may be drawn through it, as before described; or the article may be placed in a closed case containing the chloride of calcium or other fluid. The ends of the perforated tubes being open to the atmosphere, pressure may then be applied to the fluid in the closed case, and the fluid will thereby be forced through the article. Pipes, columns, and other articles of a circular figure may be formed on hollow pervious revolving cores, or on revolving surfaces, the hollow axes of which are in connection with an air-pump. The materials, when fed onto such revolving surfaces, will adhere thereto by atmospheric pressure, and may be molded or "struck up" by a proper scraper in a manner well understood.

Our invention also consists in rendering pipes or other articles of artificial stone waterproof or impervious by drawing into the pores thereof by atmospheric pressure asphalt and bituminous and other matters capable of rendering them impervious and improving the quality of the stone. For this purpose the asphalt, pitch, or other matter to be used for saturating the stone, must be rendered fluid, either by means of a suitable solvent or by heat, when of a nature to render heat necessary for its fluidity, and the article to be saturated should be immersed therein, and its hollow interior be made to communicate with the exhaust apparatus, so as to draw the fluid matter into the pores of the stone. When heat is required to render the saturating matter fluid, we prefer to heat the articles to be saturated to about the same temperature as the fluid before immersing them therein.

We desire it to be understood that, although we prefer to apply the exhaust to the bottom of the mold, as above described, it might be found convenient to apply the exhaust to other parts of the mold. In place also of forming a partial vacuum for the purposes hereinbefore described, the same general effects may be obtained by using a pressure in excess of the atmosphere, either alone or in combination with the exhaust.

Having thus described the nature of our said improvements and the manner in which the same may be carried into practical operation, we desire it to be understood that we do not confine ourselves to the precise details herein specified, provided that the general character of our said improvements is retained; but

What we claim to be new, and desire to secure by the said in part recited Letters Patent is as follows:

1. In the manufacture of grindstones and other blocks or molded pieces of artificial or concrete stone, the molding or compressing the materials of which such grindstones, blocks, or molded pieces of artificial or concrete stone are composed by means of a vacuum or partial vacuum, or by pressure, or by both vacuum and pressure combined, substantially in the manner herein described.

2. We claim the saturating and drying blocks or molded pieces of artificial stone by means of a vacuum or by pressure, or by both vacuum and pressure combined, substantially in the manner herein described.

3. We claim, in molding articles in artificial or concrete stone, the employment of perforated tubes and hollow or pervious cores for the purpose of facilitating the saturation, washing, or drying of such articles, by the employment of exhaust apparatus or by pressure.

4. We claim molding artificial or concrete stone on hollow or pervious revolving cores, the requisite pattern or configuration being "struck up" by the employment of suitable scrapers, the material being caused to adhere to and be retained on such revolving core by external atmospheric pressure operating in consequence of the exhausting of such hollow core.

5. We claim rendering water-proof or impervious pipes or other articles molded in artificial or concrete stone by drawing into the pores thereof, by means of a partial vacuum, in the manner herein described, fluid asphalt, and bituminous or other matters capable of improving the quality of the stone.

FREDK. RANSOME.
   HENRY BESSEMER.
   ERNEST LESLIE RANSOME.

Witnesses:
 G. J. WARREN,
 THOS. BROWN,
Both of No.17 Gracechurch Street, London.